(12) United States Patent
Chaskar et al.

(10) Patent No.: US 7,616,644 B2
(45) Date of Patent: Nov. 10, 2009

(54) METHOD AND APPARATUS PROVIDING A PROTOCOL TO ENABLE A WIRELESS TCP SESSION USING A SPLIT TCP CONNECTION

(75) Inventors: Hemant Chaskar, Woburn, MA (US); Govind Krishnamurthi, Arlington, MA (US)

(73) Assignee: Nokia Corporation, Espoo (FI)

( * ) Notice: Subject to any disclaimer, the term of this patent is extended or adjusted under 35 U.S.C. 154(b) by 735 days.

(21) Appl. No.: 10/788,131

(22) Filed: Feb. 25, 2004

(65) Prior Publication Data

US 2005/0185664 A1 Aug. 25, 2005

(51) Int. Cl.
H04L 12/56 (2006.01)
(52) U.S. Cl. .................................. 370/395.52
(58) Field of Classification Search .................. 370/401, 370/445, 474, 395.2, 395.3, 395.5, 395.52, 370/466, 467, 389, 469; 709/220, 245; 713/200–202
See application file for complete search history.

(56) References Cited

U.S. PATENT DOCUMENTS

| | | | |
|---|---|---|---|
| 5,941,988 A | 8/1999 | Bhagwat et al. ............. | 713/201 |
| 2001/0017862 A1* | 8/2001 | Tokuyo et al. .............. | 370/401 |
| 2003/0123481 A1* | 7/2003 | Neale et al. ................. | 370/466 |
| 2003/0131079 A1 | 7/2003 | Neale et al. ................. | 709/220 |
| 2003/0204627 A1* | 10/2003 | Mizell et al. ................ | 709/245 |
| 2006/0015576 A1* | 1/2006 | Seo et al. .................... | 709/219 |

FOREIGN PATENT DOCUMENTS

EP    1 206 071 A2    5/2002
EP    1 278 348 A1    1/2003

(Continued)

OTHER PUBLICATIONS

Ajay V. Bakre and B. R. Badrinath, "Implementation and Performance Evaluation of Indirect TCP", IEEE Transactions on Computers, vol. 46, No. 3, Mar. 1997.*

(Continued)

*Primary Examiner*—Chirag G Shah
*Assistant Examiner*—Yong Zhou
(74) *Attorney, Agent, or Firm*—Harrington & Smith, PC

(57) ABSTRACT

Disclosed are a method and a system that operates in accordance with the method to set up a TCP session between a MS and an end point destination via a wireless network and the Internet. The method includes sending a split TCP connection request from the MS to a PEP located in the network, where the split TCP request includes information for identifying a network address of the MS and a network address of the end point destination. The method further includes, in response to receiving the split TCP connection request from the MS, establishing a split TCP connection that includes a wireless TCP (WTCP) connection between the MS and the PEP, and a TCP connection at least part way between the PEP and the end point destination. In one embodiment the end point destination is an application server that is coupled to the Internet, and the TCP connection is established between the PEP and the application server. In another embodiment the end point destination is a second MS that is coupled to a second PEP in a second wireless network, and the TCP connection is established at least as far as the second PEP, and then as a WTCP connection from the second PEP to the second MS.

40 Claims, 8 Drawing Sheets

FOREIGN PATENT DOCUMENTS

| | | |
|---|---|---|
| EP | 1 206 071 A3 | 2/2005 |
| WO | WO 03/090417 A1 | 10/2003 |

OTHER PUBLICATIONS

Simpson, "Point-to-Point Protocol", IETF RFC 1661, Jul. 1994 (only first 10 pages are attached).*

"Performance Implications of Link Characteristics (pilc)", IETF, http://ietf.org/html.charters/pilc-charter.html), Jan. 30, 2004.

"Wireless Application Protocol" WAP-225-TCP-20010331-a, Version 31, Mar. 2001.

Maltz, David et al., "MSOCKS: An Architecture for Transport Layer Mobility", Mar. 29, 1998, XP010270326.

"Connecting Mobile Workstations to the Internet over a Digital Cellular Telephone Network", Markku Kojo et al., University of Helsinki, Series of Publications C., No. C-1994-39, 1994, 20 pgs.

* cited by examiner

SPLIT TCP CONNECTION

METHOD AND APPARATUS PROVIDING A PROTOCOL TO ENABLE A WIRELESS TCP SESSION USING A SPLIT TCP CONNECTION

TECHNICAL FIELD

This invention relates generally to mobile Internet devices, procedures and protocols, and more specifically relates to the set up of wireless Transport Control Protocol (TCP) sessions.

BACKGROUND

There currently exists the concept of a TCP connection that is set up over a wireless link, such as in a cellular network. Wireless TCP (WTCP) is a TCP protocol that is optimized for use in wireless environments. Wireless links are prone to long latencies and high error rates. These factors can make the conventional TCP perform poorly in the wireless link environment, as the end-to-end TCP dynamics is usually not fast enough to track the variations in the wireless link quality and thus the wireless link, which usually is the bottleneck in the end-to-end path, is not optimally used. In an attempt to overcome these problems the Internet Engineering Task Force (IETF, http://ietf.org/html.charters/pilc-charter.html), as well as the Open Mobile Alliance (OMA, http://www.openmobilealliance.org/tech/affiliates/wap/wap-225-tcp-20010331-a.pdf) have recommended a number of enhancements to conventional TCP to make it more efficient over wireless links.

One proposed enhancement recommends splitting the end-to-end TCP connection at certain intermediate network entities. For example, and referring to FIG. 1, if a mobile station (MS) 1 is to set up a TCP connection with application web server 2 in the wired Internet 4, it is recommended that one TCP connection be set up over a wireless access network 5 between the MS 1 and an intermediate network entity, sometimes referred to as a performance enhancing proxy (PEP) 3, while another TCP connection is set up between the PEP 3 and the web server 2. This enables the connection between the MS 1 and the intermediate network entity (the PEP 3) to run a version of TCP that is optimized for wireless links (also referred to as wireless profiled TCP), while the other connection runs the conventional (wireline) TCP. The intermediate network entity or PEP 3 can reside on a WAP proxy or on a gateway between the wireless access network 5 and the Internet 4.

As may be appreciated, an appropriate signaling mechanism is required to set up a split TCP connection in a cellular communications network, such as in the CDMA network architecture or in the GPRS/UMTS network architecture. Further, in the case of a mobile-to-mobile session, the PEPs 3 at each of two ends may need to communicate so that an appropriate split TCP connection can be set up.

However, while it is known in the prior art (e.g., IETF's Performance Implication of Link Characteristics (PILC) working group and the WAP 2.0 protocol) to recommend the use of the split TCP connection for performance enhancement, no mechanisms are available or have been proposed, to the knowledge of the inventors, to actually set up such split TCP connections in a cellular environment. Note in this regard that if the PEP 3 is to reside on a priori known network elements, such as on a WAP Proxy, then no specific mechanism is needed other than to have address of the WAP Proxy configured in the mobile station or other type of terminal. However, if the PEP 3 is to be hosted on a network element such as the GGSN/PDSN, these elements are not a priori known to the mobile station, as the specific GGSN/PDSN that the terminal connects to depends on the location of the mobile station.

SUMMARY OF THE PREFERRED EMBODIMENTS

The foregoing and other problems are overcome, and other advantages are realized, in accordance with the presently preferred embodiments of these teachings.

This invention provides a mechanism to set up a split TCP connection in a cellular network, and involves identifying the PEP and informing the PEP about the required connection parameters, such as the IP address and TCP port number of the remote end of the connection. The PEP, in response, sends certain parameters to the MS so that a split TCP connection can be set up.

Disclosed herein is a method, and a system that operates in accordance with the method, to set up a TCP session between a mobile terminal (MT) or mobile station (MS) and an end point destination via a wireless network and the Internet. The method includes sending a split TCP request from the MS to a PEP located in the wireless network, where the split TCP request includes information for identifying a network address of the MS and a network address of the end point destination. The method further includes, in response to receiving the split TCP request from the MS, establishing a split TCP connection that includes a wireless TCP (WTCP) connection between the MS and the PEP, and a TCP connection at least part way between the PEP and the end point destination. In one embodiment the end point destination is an application server that is coupled to the Internet, and the TCP connection is established between the PEP and the application server. In another embodiment the end point destination is a second MS that is coupled to a second PEP in a second wireless network, and the TCP connection is established at least as far as the second PEP, and then as a WTCP connection from the second PEP to the second MS.

In another embodiment the MS_A and the MS_B are served by the same PEP using two different WTCP connections.

In one exemplary embodiment the wireless network is a CDMA network, and the PEP is embodied in or is co-located with a Packet Data Support Node (PDSN) in the CDMA network. In another exemplary embodiment the wireless network is a General Packet Radio Service (GPRS) or Universal Mobile Telecommunications System (UMTS) network, and the PEP is embodied in or is co-located with a Gateway GPRS Support Node (GGSN) in the GPRS or UMTS network.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Described herein are several embodiments of split TCP connections for the case of the MS-server connection and for the case of the MS-MS connection. The case of the MS-MS connection is based on, and extends, the solution for the MS-server connection case. The general messaging and message flow is described in the context of embodiments for CDMA and GPRS/UMTS architectures. For the case of the MS-server connection the term "server" in a generic fashion, and as used herein implies that this end point of the connection is a node that does not require wireless TCP (WTCP) service.

In embodiments of this invention the end point of the connection may not be the web server 2 that is connected to the conventional wired Internet 4, but it may be another MS, thereby requiring a MS-to-MS connection to be established as described below in relation to FIG. 3B. Of course, the second MS may be functioning as a web server, just not one that is connected the wired Internet.

Case (i): MS-Web Server Connection

Assume that the MS 1 wishes to initiate a wireless TCP connection with the web server 2. The following conventions can be used in the description of this case:

x1,y1: IP address and port number at the MS 1 x2,y2: IP address and port number at the PEP 3 that the MS 1 communicates with x3,y3: IP address and port number at PEP 3 that the server 2 communicates with x4,y4: IP address and port number at the server 2 that the PEP 3 communicates with Referring also to FIG. 4, this embodiment of the invention performs the following procedure:

4A. The MS 1 sends a message to the PEP 3 specifying the need for split TCP connection. This split TCP connection request message includes, or is sent in conjunction with, information that is descriptive of (x4,y4) and (x1,y1). Note that the (x1,y1) information may be implicit in the split TCP connection request message as it is the address and port of the origin of the message (i.e., the address and port of the MS 1).

4B. The PEP 3 selects (x2,y2) and (x3,y3) to be used in the split TCP connection. This may be accomplished by a table lookup procedure.

4C. The MS 1 and the PEP 3 establish a WTCP connection between (x1,y1) and (x2,y2). For this purpose the PEP 3 may first send a message to the MS 1 informing the MS of (x2,y2), and the MS 1 may then initiate the TCP connection setup (for example, by the use of a conventional SYN, SYN ACK and ACK transaction). In an alternate embodiment, the PEP 3 may initiate the TCP connection setup with the MS 1.

4D. The PEP 3 and the server 2 set up a TCP connection between (x3,y3) and (x4,y4) (for example, by using the conventional SYN, SYN ACK and ACK handshake used to establish TCP connections).

Figure 1:
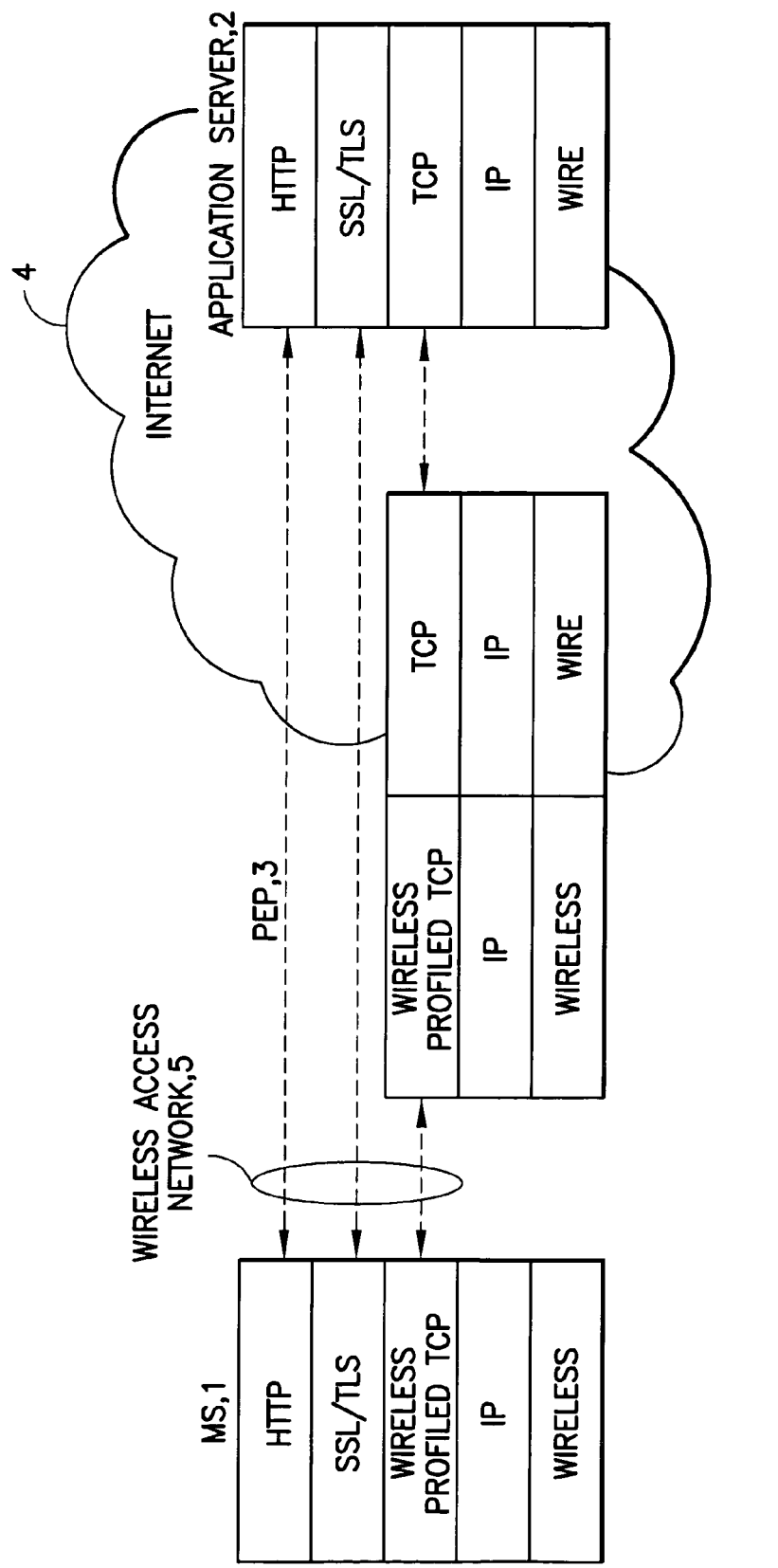
FIG. 1 is a diagram that illustrates a split TCP connection as proposed in the prior art.
Figure 2:
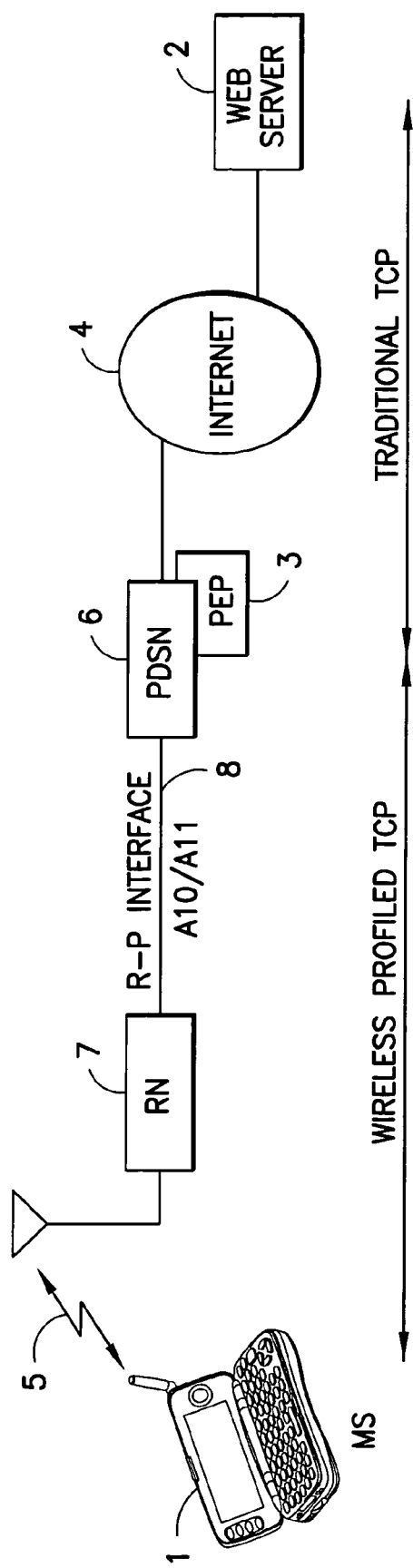
FIG. 2 shows an embodiment where a PEP is located with a PDSN in a CDMA cellular architecture, and is useful in describing a MS-web server WTCP embodiment.

Embodiment for CDMA2000 Architecture:

Referring to FIG. 2, the PEP 3 may reside on or be co-located with a Packet Data Support Node (PDSN) 6 in the CDMA network architecture defined by 3GPP2. The PEP 3 may be implemented as a software module that is executed by a data processor of the PDSN 6, or by another data processor in the CDMA network architecture. The PEP/PDSN 6 is reached from the wireless link 5 via a radio network (RN) element 7 and an A10/A11 interface 8.

For accessing the Internet 4 over the CDMA network, the MS 1 first establishes a conventional Point-to-Point Protocol (PPP) connection with the PDSN 6. If using simple IP, the MS 1 obtains its IP address during the PPP connection establishment. For mobile IP, the PDSN 6 and the MS 1 perform agent advertisement/solicitation signaling for the IP address assignment. The established PPP connection can then be used to carry out Step 4A from the MS 1 to the PDSN 6. A Resv message defined in 3GPP2 Specification X.P0011.*, Wireless IP Network Standard, February 2003, can be used in a modified form to encode the request to establish the split TCP connection and to convey the reverse link (x4,y4) information. The (x2,y2) information in Step 4C can be conveyed from the PDSN 6 to the MS 1 in a ResvConf message, also defined in 3GPP2 Specification X.P0011.*, Wireless IP Network Standard, February 2003, which functions basically as an acknowledgment to the Resv message.

Figure 3A:
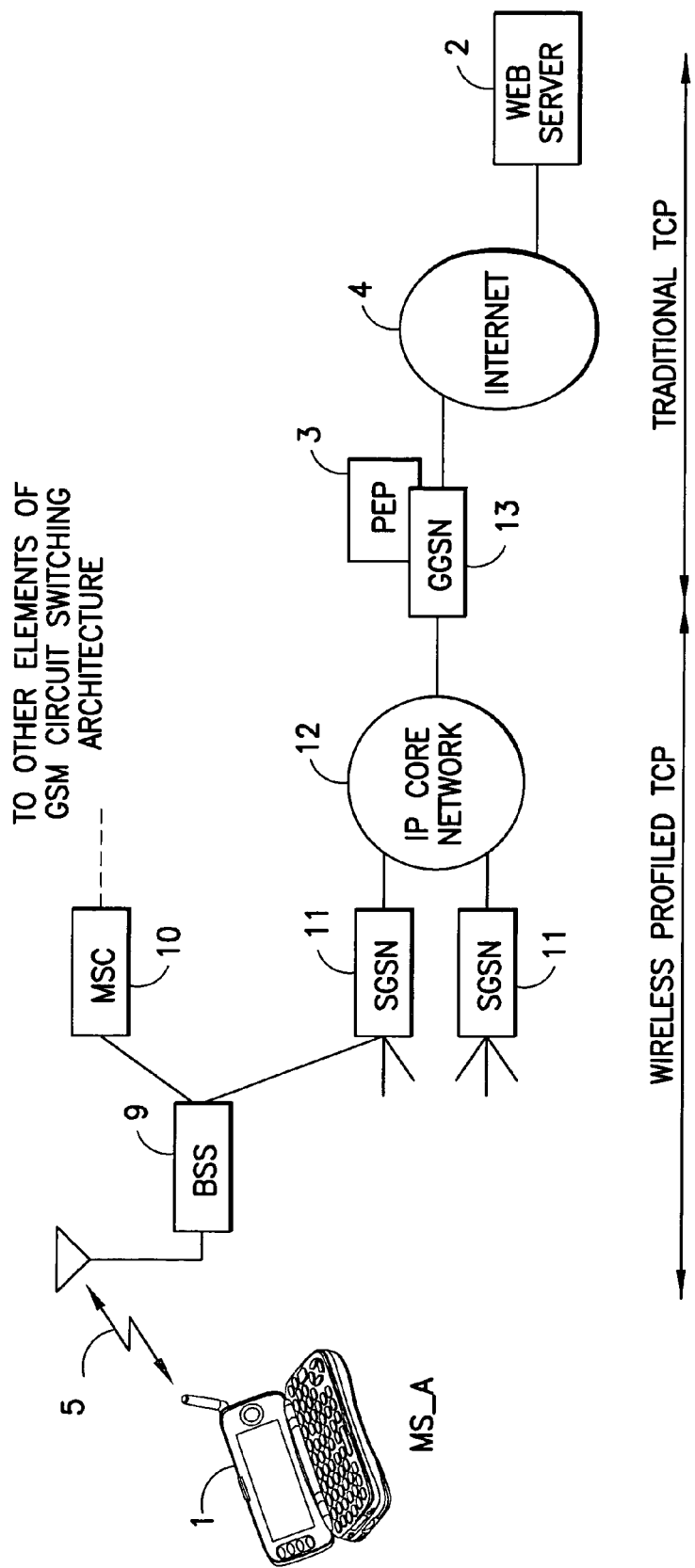
FIG. 3A shows an embodiment where a PEP is located with a GGSN in a GPRS/UMTS cellular architecture, and is also useful in describing the MS-web server WTCP embodiment.
Figure 3B:
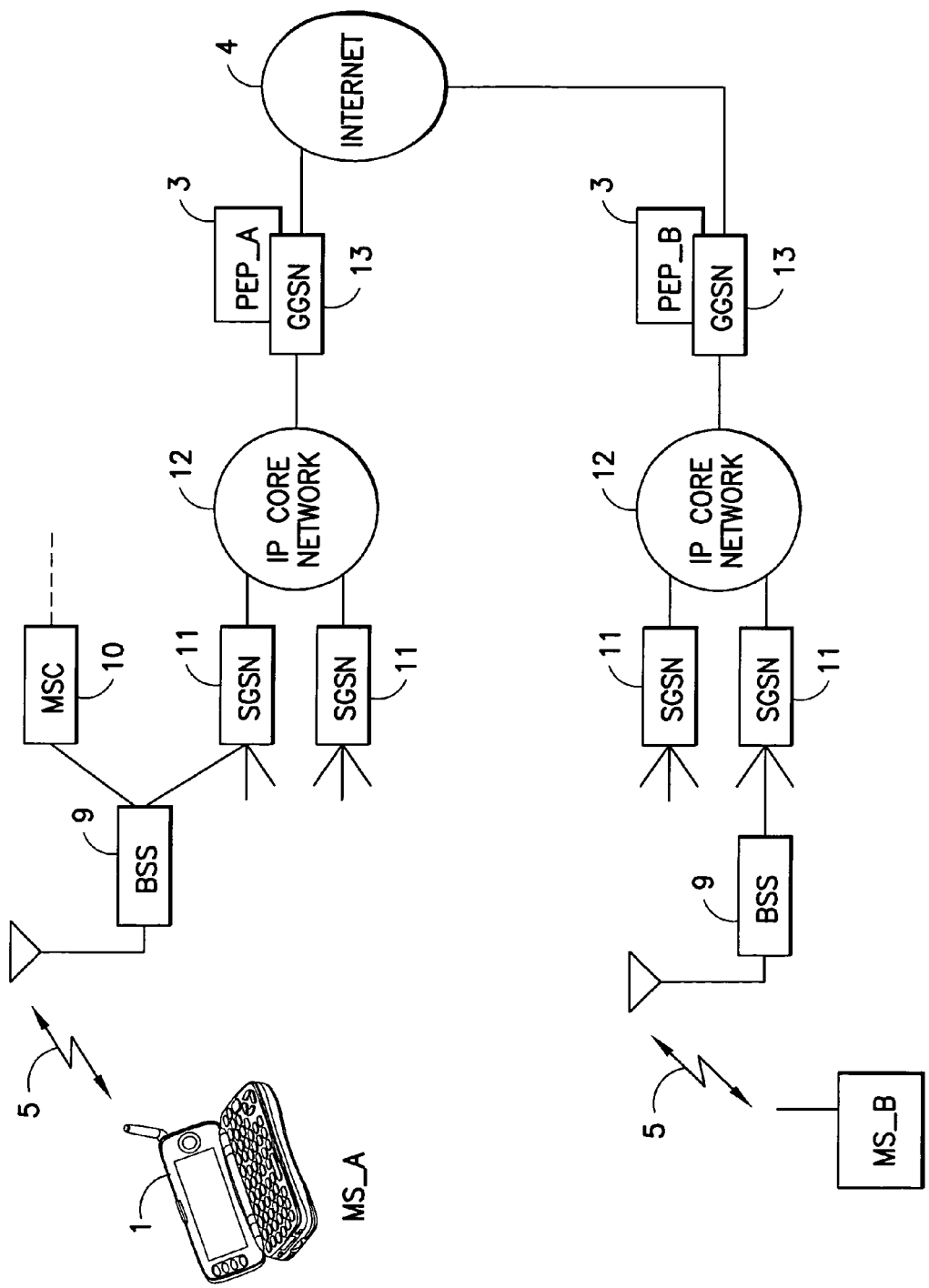
FIG. 3B shows an embodiment where a first PEP is located with a first GGSN in a first GPRS/UMTS cellular architecture and where a second PEP is located with a second GGSN in a second GPRS/UMTS cellular architecture, and is useful in describing a MS-MS WTCP embodiment.

Embodiment for GPRS/UMTS Architecture:

Further by example, and referring to FIG. 3A, the PEP 3 can reside (in a General Packet Radio System or GPRS embodiment) on or be co-located with a Gateway GPRS Support Node (GGSN) 13 in the GPRS, or in an Universal Mobile Telecommunications System (UMTS) network architecture, as defined by 3GPP. The PEP 3 may be implemented as a software module that is executed by a data processor of the GGSN 13, or by another data processor in the GPRS/UMTS network architecture. In this embodiment the PEP/GGSN 13 is reached from the wireless link 5 via a base station system (BSS) 9 that is connected to a conventional mobile switching center (MSC) 10 and to a serving gateway support node (SGSN) 11 that in turn connects to an Internet Protocol (IP) core network 12 and thence to the GGSN 13.

When accessing the Internet 4 over the GPRS network, the MS 1 first establishes a primary Packet Data Protocol (PDP) context with the GGSN 13. The MS 1 obtains its IP address during the PDP context establishment procedure, as defined in 3GPP Technical Specification TS 23.060, General Packet Radio Service (GPRS); Service description; Stage 2 (Release 1999), Version 3.10.0, January 2002. While setting up the PDP context, the MS 1 also specifies the desired service from the GPRS/UMTS access network. This can be accomplished by the use of an access point name (APN) field in a PDP Activate message. As in Step 4A for setting up the split TCP connection, the MS 1 may initiate the PDP context (primary or secondary) with the GGSN 13 by providing an APN value that is predetermined to be indicative of the request for WTCP service. The MS 1 preferably also includes the (x4,y4) information along with this message. The (x2,y2) information in Step 4C can be conveyed from the GGSN 13 to the MS 1 in an acknowledgment to the PDP Activate message, as described in 3GPP Technical Specification TS 23.060, General Packet Radio Service (GPRS); Service description; Stage 2 (Release 1999), Version 3.10.0, January 2002.

Case (ii): MS-MS Connection

Figure 4:
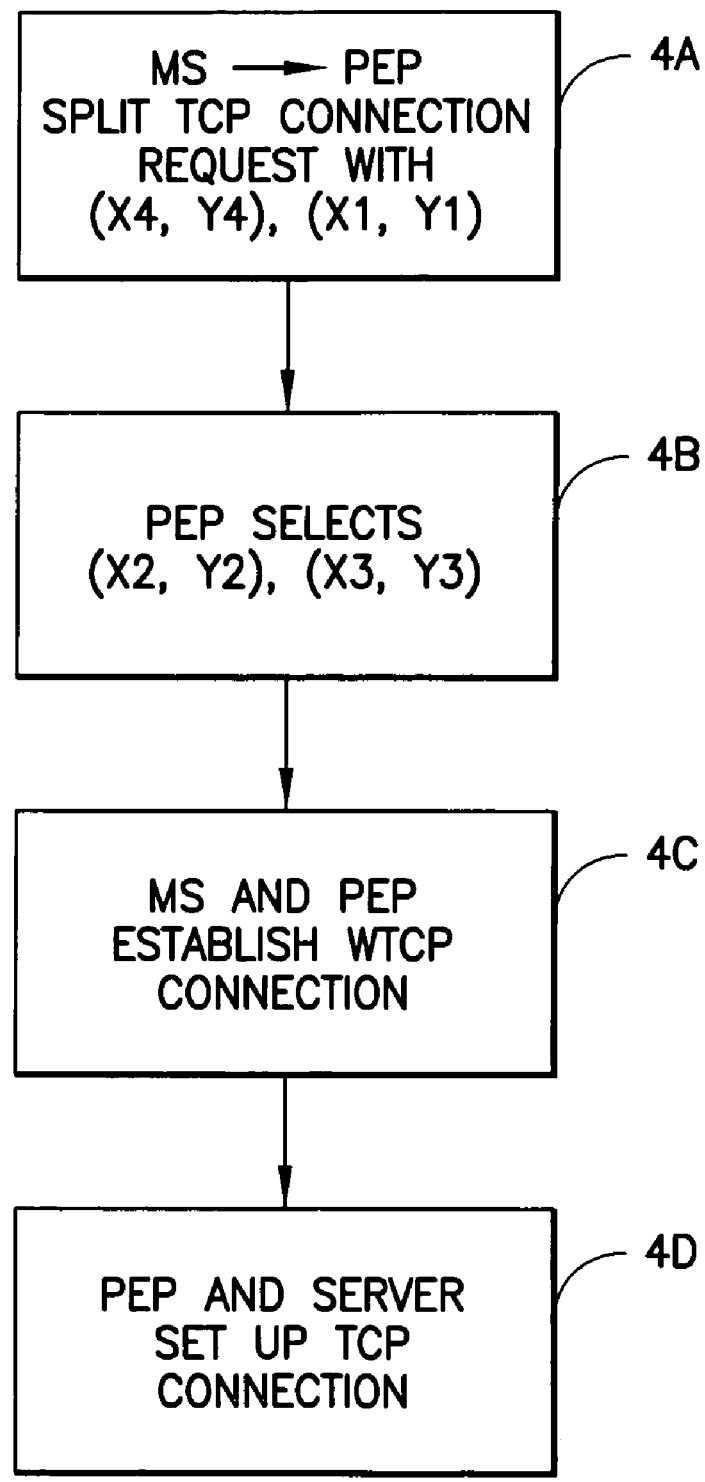
FIG. 4 is a logic flow diagram that illustrates a method for accommodating the MS-web server embodiment of FIG. 3A.
Figure 5:
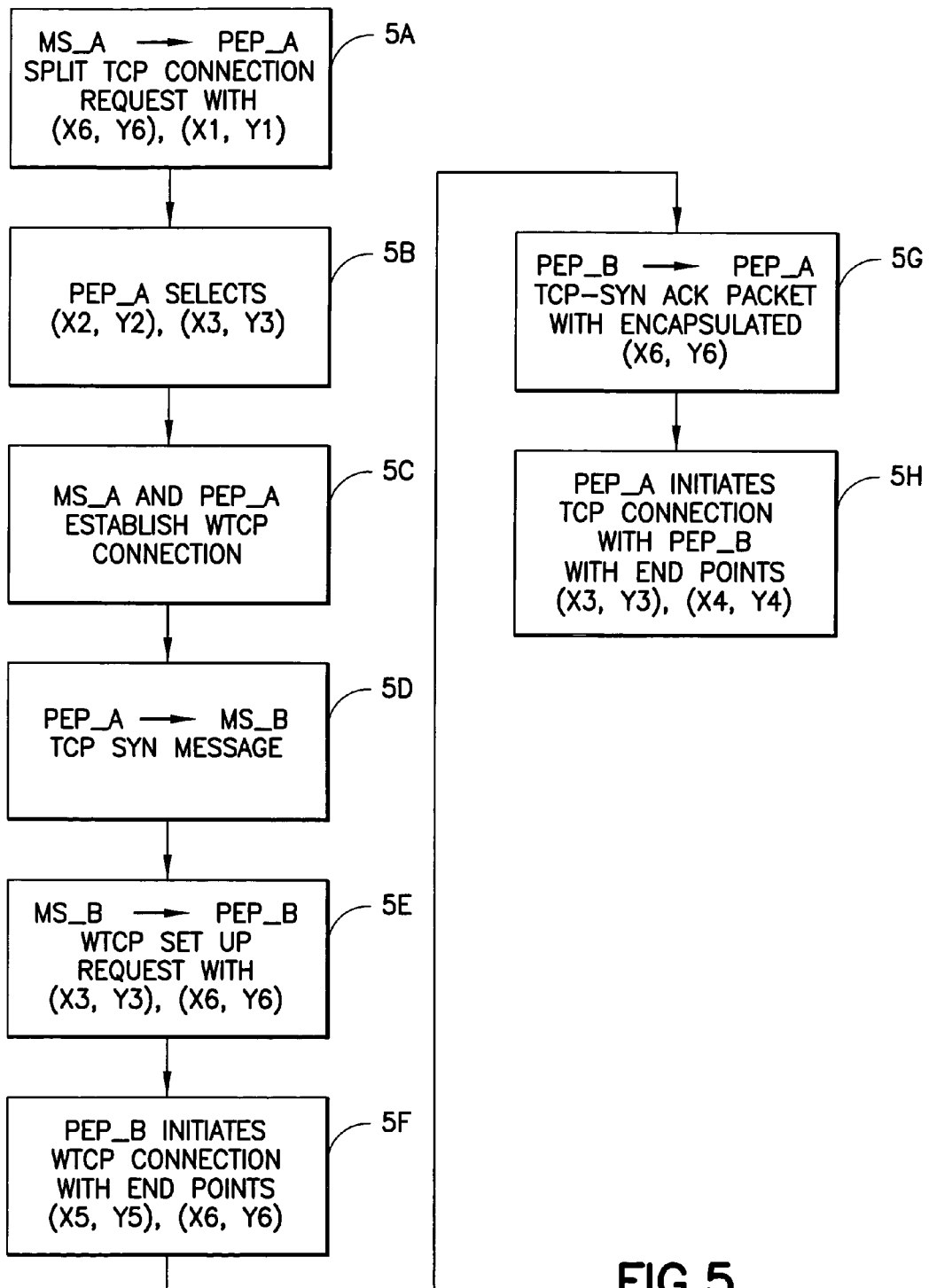
FIG. 5 is a logic flow diagram that illustrates a method for accommodating the MS-MS multi-PEP embodiment of FIG. 3B.

The foregoing discussion of FIGS. 2, 3A and 4 considered the case in which the MS 1 establishes a WTCP connection with the server 2. What is now described is the case, shown for convenience and not by way of limitation in a GPRS architecture system in FIG. 3B, in which a MS 1, say MS_A, establishes a WTCP connection with another MS 1, say MS_B. The following naming convention is used during the description of this case:

x1,y1: IP address and port number at MS_A x2,y2: IP address and port number at PEP (PEP_A) that MS_A communicates with x3,y3: IP address and port number at PEP_A that the PEP for MS_B (PEP_B) communicates with x4,y4: IP address and port number at PEP_B that PEP_A communicates with x5,y5: IP address and port number at PEP_B that MS_B communicates with x6,y6: IP address and port number at MS_B In this embodiment it may be assumed that both MS_A and MS_B desire to have a WTCP connection. The associated PEPs 3 are PEP_A and PEP_B, respectively. Referring also to FIG. 5, this embodiment of the invention performs the following procedure:

5A. The MS_A sends a message to PEP_A specifying a request for a split TCP connection to be set up, along with information about MS_B (at least (x6,y6)) and also the IP address and port number at MS_A (x1,y1). The (x1,y1) information may be implicit in the message, as it is the address and port of the origin of the message.

5B. The PEP_A selects (x2,y2) and (x3,y3) to be used in the split TCP connection, such as through a table look up procedure.

5C. The MS_A and PEP_A establish a WTCP connection between (x1,y1) and (x2,y2). For this purpose the PEP_A may first send a message to the MS_A informing MS_A of (x2,y2), and MS_A may then initiates a WTCP connection setup. In an alternate embodiment, PEP_A initiates the WTCP connection setup.

5D. PEP_A begins the process of establishing a TCP connection with MS_B. Once MS_B receives a TCP SYN message from PEP_A, it begins the procedure of establishing a WTCP connection with PEP_B.

5E. MS_B sends a message to PEP_B conveying its WTCP set up request, along with the appropriate end-point information, (x3,y3) and (x6,y6). The (x6,y6) information may be implicit in the message, as it is the address and port of the origin of the message.

5F. The PEP_B selects (x4,y4) and (x5,y5) to be used in the split TCP connection, such as through a table look up procedure. The MS_B and PEP_B establish a WTCP connection between (x6,y6) and (x5,y5). For this purpose the PEP_B may first send a message to the MS_B informing MS_B of (x5,y5), and MS_B may then initiates a WTCP connection setup. In an alternate embodiment, PEP_B initiates the WTCP connection setup.

5G. PEP_B, from (x4,y4), also sends a TCP-SYN ACK to PEP_A, at address (x3,y3), and encapsulates MS_B's information (x6,y6) in this TCP-SYN ACK packet. When PEP_A sees the encapsulated TCP-SYN ACK packet, it understands that it is a special case where PEP_B is acting as a proxy for MS_B for this particular TCP-SYN request.

5H. PEP_A initiates a TCP connection with PEP_B with end-points (x3,y3) and (x4,y4), respectively, using a conventional TCP SYN, SYN ACK and ACK handshake.

As can be appreciated, after performing steps 5A-5H there are WTCP connections established between MS_A and PEP_A, and between MS_B and PEP_B, while there is a conventional TCP connection established between PEP_A and PEP_B.

The process by which the MSs A and B acquire IP addresses in the CDMA2000 and GPRS/UMTS architectures, in this case, is similar to what is described in the previous case.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent system architectures, message types and signalling protocols may be attempted by those skilled in the art.

Figure 3C:
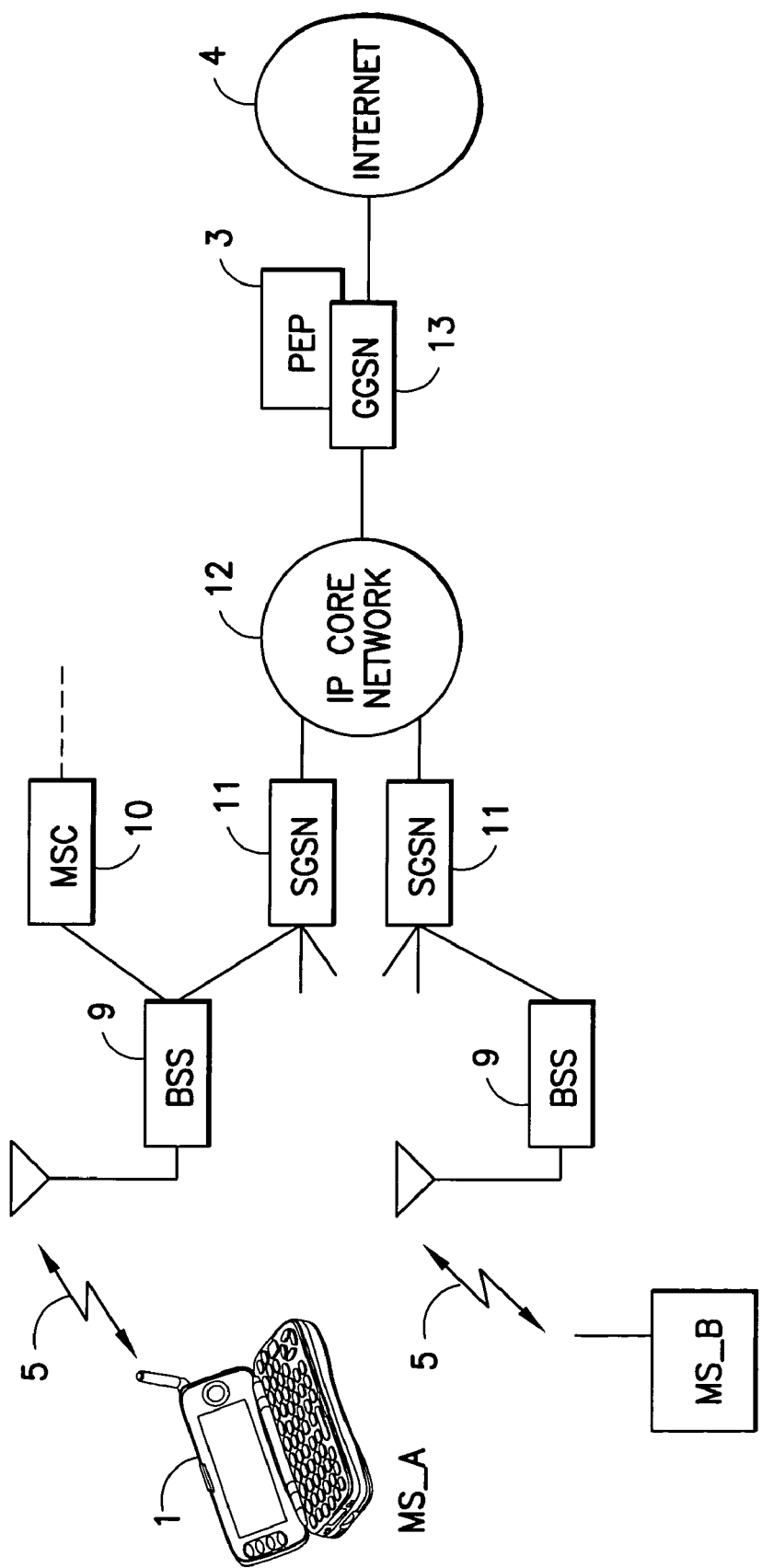
FIG. 3C shows an embodiment where a single PEP is located with the GGSN in the GPRS/UMTS cellular architecture, and is useful in describing a MS-MS WTCP embodiment.
Figure 6:
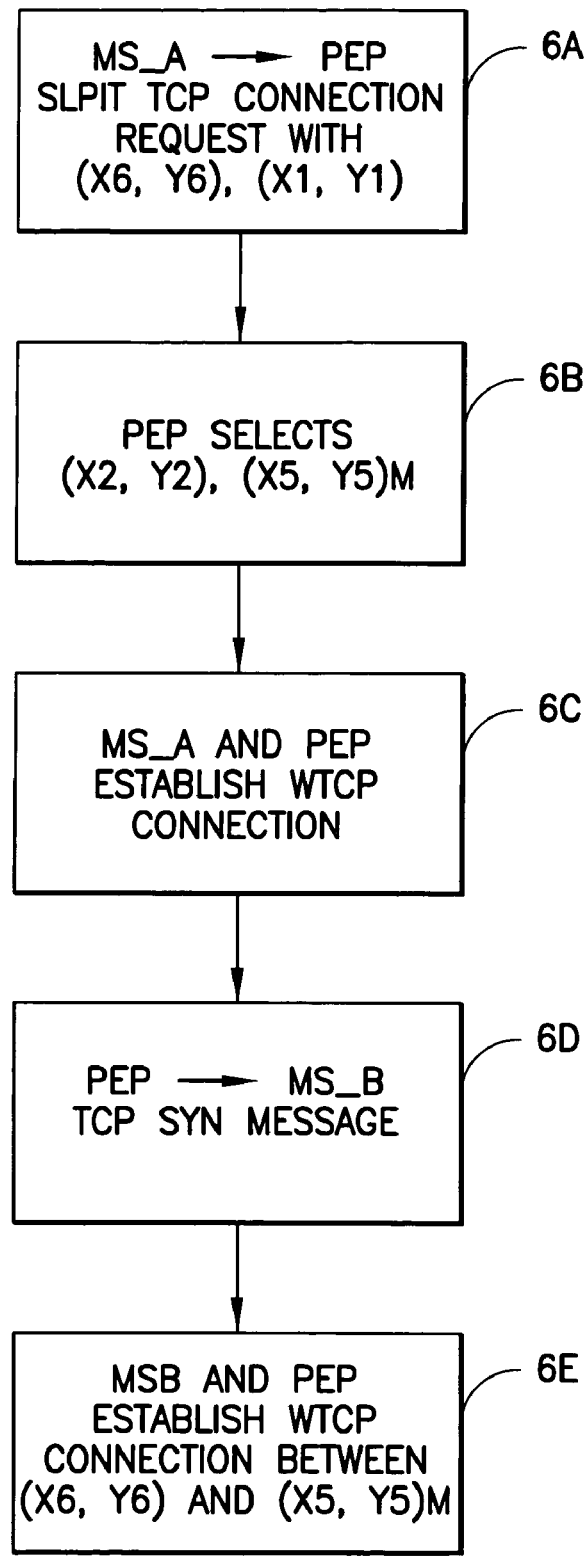
FIG. 6 is a logic flow diagram that illustrates a method for accommodating the MS-MS single PEP embodiment of FIG. 3C.

Furthermore, it is possible that MS_A and MS_B may be served from a single PEP 3, such as when they are two mobile stations connected to the same network operator. Reference in this regard can be made to FIG. 3C for showing the exemplary GPRS embodiment (note that the CDMA embodiment of FIG. 2 can be employed as well, where MS_A and MS_B are both served from the same PEP 3/PDSN 6). In the embodiment of FIG. 3C it is assumed that both MS_A and MS_B desire to have a WTCP connection. Also in this embodiment it is assumed that (x3,y3), the IP address and port number at PEP_A that PEP_B communicates with, and (x4,y4), the IP address and port number at PEP_B that PEP_A communicates with, are not used. Further, it is assumed that (x5,y5), the IP address and port number at PEP_B that MS_B communicates with, is modified so as to represent the IP address and port number at PEP 3 that MS_B communicates with. Alternatively, parameters (x7,y7) could be defined for this purpose, it being realized that the embodiments of FIGS. 3B and 3C could very well both be used together (depending on where MS_B happens to be located). Referring to FIG. 6, this embodiment of the invention performs the following procedure:

6A. The MS_A sends a message to PEP 3 specifying a request for a split TCP connection to be set up, along with information about MS_B (at least (x6,y6)) and also the IP address and port number at MS_A (x1,y1). The (x1,y1) information may be implicit in the message, as it is the address and port of the origin of the message.

6B. The PEP 3 selects (x2,y2) and modified (x5,y5), shown as $(x5,y5)_M$ in FIG. 6, or (x7, y7), to be used in the split TCP connection, such as through a table look up procedure.

6C. The MS_A and PEP 3 establish a WTCP connection between (x1,y1) and (x2,y2). For this purpose the PEP 3 may first send a message to the MS_A informing MS_A of (x2, y2), and MS_A may then initiate a WTCP connection setup. In an alternate embodiment the PEP 3 initiates the TCP connection setup.

6D. PEP 3 begins the process of establishing a TCP connection with MS_B. Once MS_B receives a TCP SYN message from PEP_A, it begins the procedure of establishing a WTCP connection with PEP 3.

6E. The MS_B and PEP 3 establish a WTCP connection between (x6,y6) and the modified (x5,y5). For this purpose the PEP 3 may first send a message to the MS_B informing MS_B of (x5,y5), and MS_B may then initiate a new TCP connection setup. In an alternate embodiment the PEP 3 initiates the TCP connection setup.

As can be appreciated, after performing steps 6A-5E there are two WTCP connections established, one between MS_A and PEP 3 and one between MS_B and PEP 3. In operation, the PEP 3 operates to copy from port-to-port.

As a further exemplary and non-limiting modification to the foregoing teachings the MS 1 need not send (x4,y4), in the embodiment of FIG. 4, or (x6,y6), in the embodiment of FIGS. 5 and 6, but may instead send a URL (such as http://www.someserver.com or http://www.somemobile.someoperator.com), and the corresponding address information can be provided using a conventional domain name server (DNS) procedure. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method, comprising:
   receiving from a mobile station at a performance enhancing proxy via a base station of a cellular network a split transport control protocol connection request to connect to an end point destination, the split transport control protocol connection request comprising information for identifying a first internet protocol address (x1) of the mobile station and a fourth internet protocol address (x4) of the end point destination, where a network node in the cellular network comprises the performance enhancing proxy;
   in response to receiving at the network node of the cellular network the split transport control protocol connection request from the mobile station, selecting a second internet protocol address (x2) and a third internet protocol address (x3) to be used on the performance enhancing proxy for the split transport control protocol connection request; and
   establishing a split transport control protocol connection comprised of a wireless transport control protocol connection between the mobile station using the first internet protocol address (x1) on the mobile station and the performance enhancing proxy using the second internet protocol address (x2) on the performance enhancing proxy, and a transport control protocol connection at least part way between the performance enhancing proxy and the end point destination using the third internet protocol address (x3) on the performance enhancing proxy, where establishing the split transport control protocol connection includes sending the second internet protocol address (x2) to the mobile station to be used for the split transport control protocol connection.

2. The method as in claim 1, where the end point destination comprises an application server that is coupled to the Internet, and where the transport control protocol connection is established between the performance enhancing proxy and the application server.

3. The method as in claim 1, where the end point destination comprises a second mobile station that is coupled to a second performance enhancing proxy in a second cellular network, and where the transport control protocol connection is established at least as far as the second performance enhancing proxy, and as a wireless transport control protocol connection between the second performance enhancing proxy and the second mobile station.

4. The method as in claim 1, where the performance enhancing proxy is embodied in or co-located with a packet data support node (PDSN) in the cellular network.

5. The method as in claim 1, where the split transport control protocol connection request is received from the mobile station over a point-to-point protocol connection.

6. The method as in claim 1, where establishing the split transport control protocol connection includes sending the selected second internet protocol address (x2) of the performance enhancing proxy to the mobile station for use in initiating a wireless transport control protocol connection set up procedure with the mobile station.

7. The method as in claim 1, where the split transport control protocol connection request is received from the mobile station in a Resv message during a point-to-point protocol connection, and where the selected second internet protocol address (x2) of the performance enhancing proxy is sent to the mobile station in a ResvConf message.

8. A method as in claim 1, where the cellular network comprises a general packet radio service or universal mobile telecommunications system network, and where the performance enhancing proxy is embodied in or co-located with a gateway general packet radio service support node in the general packet radio service or universal mobile telecommunications system network.

9. The method as in claim 1, where the split transport control protocol connection request received from the mobile station occurs during a packet data protocol context establishment procedure.

10. The method as in claim 1, where establishing the split transport control protocol connection includes sending the selected second internet protocol address (x2) of the performance enhancing proxy to the mobile station for use by the mobile station in initiating a transport control protocol connection set up procedure.

11. The method as in claim 1, where receiving the split transport control protocol request from the mobile station occurs during a packet data protocol context establishment procedure using an access point name in a packet data protocol Activate message to specify the split transport control protocol request, and where the selected second internet protocol address (x2) of the performance enhancing proxy is sent to the mobile station in an acknowledgment to the packet data protocol activate message.

12. A computer readable medium encoded with a computer program executable by a processor to perform operations to set up a transport control protocol connection between a mobile station and an endpoint destination, comprising:
   receiving from the mobile station at a performance enhancing proxy via a base station of a cellular network a split transport control protocol connection request to connect to the end point destination, the split transport control protocol connection request comprising information for identifying a first internet protocol address (x1) of the mobile station and a fourth internet protocol address (x4) of the end point destination, where a network node in the cellular network comprises the performance enhancing proxy;
   in response to receiving the split transport control protocol connection request from the mobile station selecting a second internet protocol address (x2) and a third internet protocol address (x3) to be used on the performance enhancing proxy for the split transport control protocol connection request; and establishing a split transport control protocol connection comprised of a wireless transport control protocol connection between the mobile station using the first internet protocol address (x1) on the mobile station and the performance enhancing proxy using the second internet protocol address (x2) on the performance enhancing proxy, and a transport control protocol connection between the performance enhancing proxy using the third internet protocol address (x3) on the performance enhancing proxy and the end point destination using the fourth internet protocol address (x4) on the endpoint destination, where establishing the split transport control protocol connection includes sending the second internet protocol address (x2) to the mobile station to be used for the split transport control protocol connection.

13. The computer readable medium encoded with a computer program as in claim 12, where x1,y1 represents a first internet protocol address and port number at the mobile station; x2,y2 represents a second internet protocol address and port number at the performance enhancing proxy that the mobile station communicates with; x3,y3 represents a third internet protocol address and port number at the performance enhancing proxy that the end point destination communicates with; and x4,y4 represents a fourth internet protocol address and port number at the end point destination, and further comprising:

receiving a split transport control protocol connection request message from the mobile station that comprises information that is descriptive of (x4,y4) and (x1,y1);

selecting (x2,y2) and (x3,y3) to be used on the performance enhancing proxy in the split transport control protocol connection;

establishing with the mobile station a wireless transport control protocol connection between (x1,y1) and (x2,y2); and establishing with the end point destination a transport control protocol connection between (x3,y3) and (x4,y4).

14. The computer readable medium encoded with a computer program as in claim 13, where for the mobile station and the performance enhancing proxy to establish the wireless transport control protocol connection the performance enhancing proxy sends a message to the mobile station informing the mobile station of the second internet protocol address and port number at the performance enhancing proxy (x2,y2), and in response the performance enhancing proxy receives from the mobile station an indication to begin the transport control protocol connection setup.

15. The computer readable medium encoded with a computer program as in claim 14, where the indication received from the mobile station is a synchronize, synchronize acknowledge and acknowledge transaction.

16. The computer readable medium encoded with a computer program as in claim 12, where to establish the wireless transport control protocol connection between the performance enhancing proxy and the mobile station the performance enhancing proxy initiates the wireless transport control protocol connection setup with the mobile station.

17. The computer readable medium encoded with a computer program as in claim 12, where the performance enhancing proxy initiates the wireless transport control protocol connection setup by the use of a synchronize, synchronize acknowledge and acknowledge transaction.

18. The computer readable medium encoded with a computer program as in claim 13, where (x1, y1) is received implicitly from the mobile station in the split transport control protocol connection request message.

19. A computer readable medium encoded with a computer program executable by a processor to perform operations to set up a transport control protocol session between a first mobile station (MS_A) and a second mobile station (MS_B) via a a cellular network and the Internet, comprising:

receiving at a first performance enhancing proxy (PEP_A) via the a base station of the cellular network a split transport control protocol connection request from the first mobile station (MS_A) to connect to the second mobile station (MS_B) comprising information identifying a first internet protocol address (x1) of the MS_A, where a network node in the cellular network comprises the first performance enhancing proxy; and responsive to receiving the split transport control protocol request from the MS_A selecting a second internet protocol address (x2) to be used on the PEP_A for the split transport control protocol connection request; and establishing a split transport control protocol connection comprised of a first wireless transport control protocol connection between the MS_A using the first internet protocol address (x1) on the MS_A and the PEP_A using the second internet protocol address (x2) on the PEP_A, where the establishing initiates a transport control protocol connection between the PEP_A using a third internet protocol address (x3) on the PEP_A and a second performance enhancing proxy (PEP_B) using fourth internet protocol address (x4) on the PEP_B, and where the establishing initiates a second wireless transport control protocol connection between the PEP_B using a fifth internet protocol address (x5) on the PEP_B and the MS_B using a sixth internet protocol address (x6) on the MS_B.

20. The computer readable medium encoded with a computer program as in claim 19, where x1,y1 represents an internet protocol address and port number at MS_A; x2,y2 represents an internet protocol address and port number at the PEP_A used to communicate with the MS_A; x3,y3 represents an internet protocol address and port number at the PEP_A used to communicate with the PEP_B; x4,y4 represents an internet protocol address and port number at PEP_B that PEP_A communicates with; x5,y5 represents an internet protocol address and port number at PEP_B for communication with MS_B; and x6,y6 represents an internet protocol address and port number at MS_B, and further comprising:

receiving a split transport control protocol connection request message that comprises information that is descriptive of (x6,y6) and (x1,y1);

selecting internet protocol addresses and port numbers (x2, y2) and (x3,y3) to be used on the PEP_A for the split transport control protocol connection;

establishing a wireless transport control protocol connection between the mobile station internet protocol address and port number (x1,y1) and the PEP_A address and port number (x2,y2);

the PEP_A initiating the establishment of a transport control protocol connection with MS_B by sending a message to MS_B, where the establishment includes the MS_B and the PEP_B establishing a wireless transport control protocol connection;

receiving at the internet protocol address and port of the PEP_A (x3,y3) from the internet protocol address and port of the PEP_B (x4,y4) a transport control protocol synchronize acknowledge packet that encapsulates at least the internet protocol address and port number of the MS_B (x6,y6); and interpreting the encapsulated transport control protocol synchronize acknowledge packet as a case where PEP_B is acting as a proxy for MS_B, and initiating a transport control protocol connection with PEP_B with end-points (x3,y3) and (x4,y4).

21. The computer readable medium encoded with a computer program as in claim 19, where the PEP_A sending a transport control protocol synchronize message to the MS_B initiates the MS_B sending a wireless transport control protocol connection request to the PEP_B for establishing the wireless transport control protocol connection.

22. The computer readable medium encoded with acomputerprogram as in claim 20, where for MS_A and PEP_A to establish the wireless transport control protocol connection PEP_A sends a message to MS_A informing MSA of the selected address and port number of the (x2,y2), and in response the PEP_A receives from the MS_A an indication to begin the transport control protocol connection setup.

23. The computer readable medium encoded with a computer program as in claim 19, where the indication received from the MS_A is a synchronize, synchronize acknowledge and acknowledge transaction.

24. The computer readable medium encoded with a computer program as in claim 19, where to establish the wireless transport control protocol connection between the PEP_A and the MS_A the PEP_A initiates the transport control protocol connection setup with the MS_A.

25. The computer readable medium encoded with a computer program as in claim 19, where the PEP_A initiates the transport control protocol connection setup by the use of a synchronize, synchronize acknowledge and acknowledge transaction.

26. The computer readable medium encoded with a computer program as in claim 20, where (x1,y1) is received implicitly from MS_A in the split transport control protocol connection request message.

27. The computer readable medium encoded with a computer program as in claim 20, where (x6, y6) is received implicitly from MS_B in the wireless transport control protocol connection request.

28. The computer readable medium encoded with a computer program executable by a processor to set up a transport control protocol session between a first mobile station (MS_A) and a second mobile station (MS_B) via aa cellular network, comprising:
sending from the MS_A a split transport control protocol connection request to a performance enhancing proxy located in the cellular network, where the request comprises information identifying a a first internet protocol address (x1) of the MS_A and a fourth internet protocol address (x4) of the MS_B, where a network node in the cellular network comprises the performance enhancing proxy;
in response to sending the split transport control protocol request receiving from the performance enhancing proxy a second internet protocol address (x2) on the performance enhancing proxy to establish a first wireless transport control protocol connection between MS_A and the performance enhancing proxy;
establishing the first wireless transport control protocol connection with the selected network address on the performance enhancing proxy using the second internet protocol address (x2) on the performance enhancing proxy, where the establishing initiates a second wireless transport control protocol connection between the performance enhancing proxy using a third internet protocol address (x3) on the performance enhancing proxy and the MS_B using the fourth internet protocol address (x4) on the MS_B; and
initiating a transport control protocol session with the MS_B via the second wireless transport control protocol connection between the performance enhancing proxy and MS_B.

29. A mobile terminal comprising:
a data processor bidirectionally coupled to an interface to a cellular network, said data processor operable to initiate setup of a transport control protocol connection between the mobile terminal and an end point destination via the cellular network and the Internet, said data processor sending a split transport control protocol connection request to a performance enhancing proxy located in the cellular network, where a network node in the cellular network comprises the performance enhancing proxy
the split transport control protocol connection request comprising information for identifying a first internet protocol address (x1) of the mobile terminal and a fourth internet protocol address (x4) of the end point destination; and in response to the sending, receiving at the mobile terminal a second internet protocol address (x2) to be used on the performance enhancing proxy for the split transport control protocol request and an indication of the split transport control protocol connection comprised of a wireless transport control protocol connection established between the mobile terminal and the performance enhancing proxy, where the connection established initiates a transport control protocol connection using a third internet protocol address (x3) on the performance enhancing proxy at least part way between the performance enhancing proxy and the end point destination, said data processor conducting a transport control protocol session with the end point destination.

30. The mobile terminal as in claim 29, where the end point destination comprises an application server that is coupled to the Internet, and where the transport control protocol connection is established between the performance enhancing proxy and the application server.

31. The mobile terminal as in claim 29, where the end point destination comprises a second mobile terminal that is coupled to a second performance enhancing proxy in a second wireless communications network, and where the transport control protocol connection is established at least as far as the second performance enhancing proxy, and then as a wireless transport control protocol connection between the second performance enhancing proxy and the second mobile terminal.

32. The mobile terminal as in claim 29, where the wireless communications network comprises a cellular network.

33. An apparatus, comprising:
an interface configured to be coupled to a base station of a cellular network to receive a split transport control protocol connection request from a mobile station to connect to an end point destination, the split transport control protocol connection request comprising information for identifying a first internet protocol address (x1) of the mobile station and a fourth internet protocol address (x4) of the end point destination, where a network node in the cellular network comprises the apparatus; and
a data processor configured, in response to receiving the split transport control protocol connection request from the mobile station, to select a second internet protocol address (x2) and a third internet protocol address (x3) to be used to establish a split transport control protocol connection comprised of a wireless transport control protocol connection with the mobile station via the interface using the second internet protocol address (x2), and a transport control protocol connection with the end point destination using the third internet protocol address (x3), where establishing the split transport control protocol connection includes sending the second internet protocol address (x2) to be used for a split transport control protocol connection to the mobile station for use by the mobile station in initiating a wireless transport control protocol connection set up procedure.

34. The apparatus as in claim 33, where to establish the wireless transport control protocol connection with the mobile station the data processor is configured to initiate a wireless transport control protocol connection setup with the mobile station.

35. The apparatus as in claim 33, where the end point destination comprises a second mobile station that is coupled to a second apparatus, and where the transport control protocol connection is established at least as far as the second apparatus, and as a wireless transport control protocol connection between the second apparatus and the second mobile station.

36. The apparatus as in claim 33, where the apparatus is embodied in or co-located with a packet data support node in the cellular network.

37. The apparatus as in claim 33, where the split transport control protocol connection request is received from the mobile station over a point-to-point protocol connection.

38. The apparatus as in claim 33, where establishing the split transport control protocol connection includes sending the second internet protocol address (x2) to be used for a split transport control protocol connection to the mobile station for use by the mobile station in initiating a wireless transport control protocol connection set up procedure.

39. The apparatus as in claim 33, where the split transport control protocol connection request is received from the mobile station using a Resv message during a point-to-point protocol connection, and where the second internet protocol address is sent to the mobile station in a ResvConf message.

40. An apparatus as in claim 33, where the cellular network comprises a general packet radio service or universal mobile telecommunications system network, and where the performance enhancing proxy is embodied in or co-located with a gateway general packet radio service support node in the general packet radio service or universal mobile telecommunications system network.

* * * * *

UNITED STATES PATENT AND TRADEMARK OFFICE
CERTIFICATE OF CORRECTION

PATENT NO. : 7,616,644 B2
APPLICATION NO. : 10/788131
DATED : November 10, 2009
INVENTOR(S) : Chaskar et al.

It is certified that error appears in the above-identified patent and that said Letters Patent is hereby corrected as shown below:

IN THE CLAIMS:

Claim 28, col. 11, line 44, delete "aa" and insert --a--.

Claim 28, col. 11, line 49, delete "a". (second occurrence)

Signed and Sealed this

Twelfth Day of January, 2010

David J. Kappos
*Director of the United States Patent and Trademark Office*